(12) United States Patent
Ma et al.

(10) Patent No.: US 8,514,521 B2
(45) Date of Patent: Aug. 20, 2013

(54) HARD DISK DRIVE SLIDER

(75) Inventors: Yansheng Ma, Singapore (SG); Bo Liu, Singapore (SG); Leonard Gonzaga, Singapore (SG)

(73) Assignee: Agency for Science Technology and Research, Singapore (SG)

( * ) Notice: Subject to any disclaimer, the term of this patent is extended or adjusted under 35 U.S.C. 154(b) by 0 days.

(21) Appl. No.: 13/415,300

(22) Filed: Mar. 8, 2012

(65) Prior Publication Data
US 2012/0229933 A1    Sep. 13, 2012

(51) Int. Cl.
*G11B 5/127* (2006.01)

(52) U.S. Cl.
USPC ...................................... 360/235.7

(58) Field of Classification Search
USPC .......... 360/235.7, 235.8, 235.6, 235.1, 236.3, 360/236.2, 236.1, 236.5
See application file for complete search history.

(56) References Cited

U.S. PATENT DOCUMENTS

| | | | |
|---|---|---|---|
| 6,188,547 B1 * | 2/2001 | Gui et al. | 360/236.5 |
| 6,445,543 B1 * | 9/2002 | Gui et al. | 360/236.6 |
| 6,633,455 B2 * | 10/2003 | Tokisue et al. | 360/236.3 |
| 7,511,922 B2 * | 3/2009 | Musashi et al. | 360/235.7 |
| 8,203,805 B2 * | 6/2012 | Huang et al. | 360/235.4 |
| 2007/0076327 A1 * | 4/2007 | Yang et al. | 360/294.4 |
| 2009/0141403 A1 * | 6/2009 | Hu et al. | 360/235.7 |
| 2010/0226035 A1 * | 9/2010 | Huang et al. | 360/75 |
| 2012/0250190 A1 * | 10/2012 | Kim | 360/235.7 |
| 2012/0275051 A1 * | 11/2012 | Scheppers et al. | 360/96.61 |

* cited by examiner

*Primary Examiner* — Allen T Cao
(74) *Attorney, Agent, or Firm* — Conley Rose, P.C.

(57) ABSTRACT

A hard disk drive system is provided. The hard disk drive system includes a hard disk and at least one slider structure for reading data from and writing data onto the hard disk. The hard disk includes a plurality of layers, and at least a topmost one of the plurality of layers comprises a lubricant layer. The at least one slider structure includes an air bearing surface and one or more structures for forming lubricant reservoirs. The air bearing surface includes a read/write sensor for reading and writing the data from/onto the hard disk. And the one or more structures form the lubricant reservoirs which are fluidically coupled to the air bearing surface to prevent lubricant buildup on the air bearing surface.

24 Claims, 9 Drawing Sheets

HARD DISK DRIVE SLIDER

CROSS-REFERENCE TO RELATED APPLICATION

The present application claims priority to Singapore Patent Application No. 201101763-9, filed 9 Mar. 2011 and Singapore Patent Application No. 201106758-4, filed 19 Sep. 2011.

FIELD OF THE INVENTION

The present invention generally relates to hard disk drive systems, and more particularly relates to sliders for hard disk drive systems with lubricant containment features.

BACKGROUND OF THE DISCLOSURE

In a hard disk drive, a slider attaches a magnetic read/write sensor that reads and writes data on the disk to a suspension arm that moves the sensor to a desired track on the disk. The slider is configured to maintain the head at a stable flying height above the disk surface, creating a magnetic spacing as well as an air-bearing cushion resulting from the compression of air flow generated between the rotating disk and an air-bearing surface (ABS) of the slider facing the rotating disk.

The magnetic disk in the hard disk drive is where the magnetic data (bits) are stored in a form of magnetized and non-magnetized bits. The bits are stored in a soft magnetic material coated on the disk. On top of this magnetic material a very thin protective layer of diamond-like carbon (DLC) and a top lubricant layer for reducing friction and wear are provided. The DLC and lubricant layer protect the disk from corrosion and also prevent catastrophic failure due to slider disk contact.

As the physical spacing between the slider and the disk is reduced to achieve smaller magnetic spacing, the lubricant on the disk surface migrates to the slider body. Most of this lubricant flows from the leading edge towards the trailing edge of the slider due to the air shear force imparted by the air flow from the rotating disk. The lubricant accumulates at the trailing edge of the slider especially at the trailing edge face perpendicular to the air bearing surface. When the slider is unloaded or is non-operational, the accumulated lubricant can migrate back to the ABS surface in response to gravitational or other attractive forces. The migrating lubricant may coat the ABS where the read/write sensor is located, thereby providing an effectively increased magnetic spacing when the slider is loaded back on the rotating disk leading to a significant degradation in recording performance until the air shear force pushes the lubricant off of the ABS surface. With today's magnetic spacing being below 10 nm, a few Angstroms of lubricant film on the ABS can lead to a measurable loss of magnetic sensitivity.

The accumulated lube can also drop off of the slider and back onto the disk surface. This is commonly known as disk drive performance degradation caused by lubricant pick-up. The lubricant droplet can impact the slider stability as it flies over it and severe slider instability could lead to catastrophic head crash.

One solution that has been proposed to the lubricant pick-up problem is to retract the magnetic head to an area where circumferential speed is fastest when the hard disk drive is first powered on, such as to an outermost side of the flying guarantee area of the hard disk. The lubricant transferred from the disk to the slider can then be removed. However, it takes a long time (usually from seconds to minutes) to shear the lubricant off the trailing end of the slider, and remaining lubricant can again flow back onto the disk surface to undesirably increase the magnetic spacing and negatively affect the slider-disk interface.

Thus, what is needed is a slider for a hard disk drive which eliminates the problems associated with transferred lubricants. Furthermore, other desirable features and characteristics will become apparent from the subsequent detailed description and the appended claims, taken in conjunction with the accompanying drawings and this background of the disclosure.

SUMMARY

According to the Detailed Description, a slider for reading data from and writing data onto a hard disk is provided. The slider includes an air bearing surface and one or more structures for forming lubricant reservoirs. The air bearing surface provides a read/write sensor above the surface of the hard disk. And the one or more structures for forming lubricant reservoirs are fluidically coupled to the air bearing surface to prevent lubricant buildup thereon In accordance with another aspect, a hard disk drive system is provided. The hard disk drive system includes a hard disk and at least one slider structure for reading data from and writing data onto the hard disk. The hard disk includes a plurality of layers, and at least a topmost one of the plurality of layers comprises a lubricant layer. The at least one slider structure includes an air bearing surface and one or more structures for forming lubricant reservoirs. The air bearing surface includes a read/write sensor for reading and writing the data from/onto the hard disk. The one or more structures form the lubricant reservoirs which are fluidically coupled to the air bearing surface to prevent lubricant buildup on the air bearing surface.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present invention.

FIG. 1, including FIGS. 1A and 1B, illustrates a front, top, right perspective view of a slider in accordance with the present embodiment, wherein FIG. 1A illustrates the slider during operation when flying over a rotating hard disk and FIG. 1B illustrates the slider in a non-operational state at rest over the hard disk.

FIG. 2, including FIGS. 2A to 2F, illustrates a slider in accordance with the present embodiment, wherein FIG. 2A illustrates a rear, bottom, left perspective of the slider and FIGS. 2B to 2F are planar cross-sectional end views of various embodiment of lubricant reservoirs formed by structures on a trailing edge surface of the slider.

FIG. 3, including FIGS. 3A to 3D, illustrates the slider of FIG. 2 in accordance with the present embodiment, wherein FIG. 3A illustrates a rear, bottom, left perspective of the slider and FIGS. 3B to 3D are planar cross-sectional side views of various embodiments of the structures forming the lubricant reservoirs on the trailing edge surface of the slider.

Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of the present and alternate embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of this invention to manage and control the lubricant accumulation on a slider body by eliminating the impact of transferred lubricants to the slider body by channeling the lubricant to non-critical areas of the slider and containing it within lubricant reservoirs at those non-critical areas.

Figures 1A, 1B:
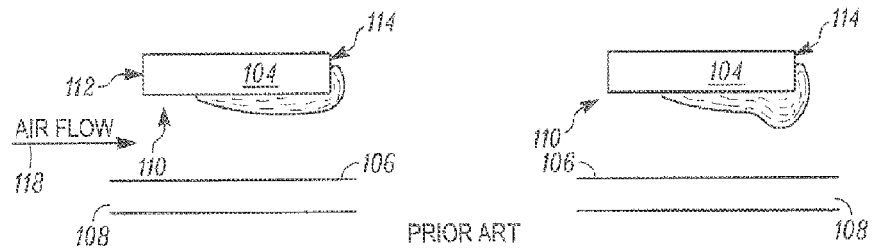

Referring to FIG. 1, including FIGS. 1A and 1B, diagrams 100 (FIG. 1A) and 102 (FIG. 1B) illustrate front top, right perspective views of a slider 104 in accordance with the present embodiment. The diagram 100 illustrates the slider 104 during operation when flying over a rotating hard disk 106. The diagram 102 illustrates the slider 104 in a non-operational state at rest over the hard disk 106.

Those skilled in the art will understand that some hard disk drives have reading and writing to soft magnetic layers from independently operated sliders on both sides of the rotating hard disk. For simplification of description of the present embodiments, a slider operating over only one side of the hard disk will be addressed. It is, however, understood that the problems described herein and the present embodiments are equally applicable to sliders on either side of the hard disk, or to sliders on both sides of the hard disk.

In today's hard disk drives, the fly height of the slider 104 over the hard disk 106 is typically below ten nanometers, and can be as low as two nanometers. The hard disk 106 includes a plurality of layers, and a topmost one of the plurality of layers is a lubricant layer 108 having a thickness of approximately twelve to fifteen nanometers. The lubricant layer 108 and an underlying very thin protective layer of diamond-like carbon (DLC) reduce friction and wear while protecting the hard disk 106 from corrosion and slider disk contact.

As the slider 104 flies over the rotating hard disk 106, an air bearing surface 110 facing the hard disk 106 receives the lubricant 108 from the hard disk 106 which migrates from the hard disk 106 surface to the slider 104. Most of this lubricant flows from the leading edge 112 towards the trailing edge surface 114 of the slider 104 due to the air shear force imparted by the air flow (indicated by arrow 118) from the rotating hard disk 106. The lubricant accumulates at the trailing edge of the slider 104, especially at the trailing edge surface 114 perpendicular to the air bearing surface 110 as shown by the accumulated lubricant 120 in the diagram 100.

When the slider 104 is unloaded or is non-operational, the accumulated lubricant 120 can migrate back to the air bearing surface 110 in response to gravitational or other attractive forces, as shown in the diagram 102. The migrating lubricant may coat a portion of the air bearing surface 110 where the read/write sensor is located, thereby providing an effectively increased magnetic spacing when the slider 104 is loaded back over the rotating hard disk 106. This leads to a significant degradation in recording performance until the air shear force pushes the lubricant off of the air bearing surface 110. With today's nanometer-range magnetic spacing, a few Angstroms of lubricant film on the air bearing surface 110 can lead to a measurable loss of magnetic sensitivity.

Figure 2A:
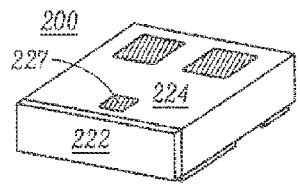
Figures 2B, 2C, 2D, 2E, 2F:
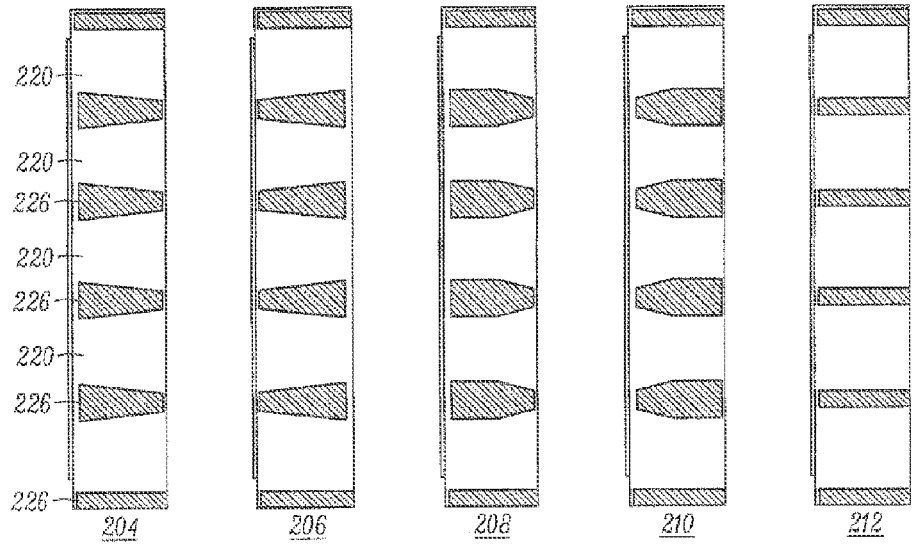

Referring to FIG. 2, a slider 200 in accordance with the present embodiment is depicted. FIG. 2 includes FIGS. 2A to 2F. FIG. 2A illustrates a rear, bottom, right perspective 202 of the slider 200. FIGS. 2B to 2F are planar cross-sectional end views 204, 206, 208, 210, 212 of various embodiments of channels 226 formed between structures 220 on a trailing edge surface 222 of the slider 200.

The slider 200 includes an air bearing surface 224 including a read/write sensor 227 which operates in a manner well known to those skilled in the art. The trailing edge surface 222 is a surface orthogonal to and having a shared edge with the air bearing surface 224. Lubricant reservoirs 218 preferably include the channels 226 formed between structures 220 formed on the trailing edge surface 222.

Lubricant is channeled to and retained in the lubricant reservoirs 218 by capillary action and surface tension. The structures 220 have predetermined outlines to form the lubricant reservoirs 218 having the channels 226 of one or more geometric shapes for the lubricant to enter the lubricant reservoirs 218 by capillary action and the lubricant reservoirs 218 to maintain the lubricant therein by surface tension. Referring to planar views 204, 206, 208, 210 and 212, exemplary geometric shapes for cross-sections of the channels 226 are depicted. The planar cross-sections are viewed from the trailing edge surface 222.

The planar view 204 (FIG. 2B) depicts a channel 226 having a trapezoidal shape wherein a lubricant entry side has a longer length than a side opposite to and parallel to the lubricant entry side. The planar view 206 (FIG. 2C) depicts a channel 226 having a trapezoidal shape wherein a lubricant entry side has a smaller length than a side opposite to and parallel to the lubricant entry side. The planar view 208 (FIG. 2D) depicts a channel 226 having an entry portion having a rectangular shape and a remaining portion having a trapezoidal shape, the trapezoidal shape of the remaining portion having a first side adjoining the entry portion with a longer length than a second side opposite to and parallel to the first side. The planar view 210 (FIG. 2E) depicts a channel 226 having an entry portion having a trapezoidal shape and a remaining portion having a rectangular shape, the trapezoidal shape of the entry portion having a lubricant entry side with a smaller length than a side opposite to and parallel to the lubricant entry side. The planar view 212 (FIG. 2F) depicts a channel 226 having a rectangular shape with a lubricant entry side having a substantially equal length to a side opposite to and parallel to the lubricant entry side.

Figures 3A, 3B, 3C, 3D:
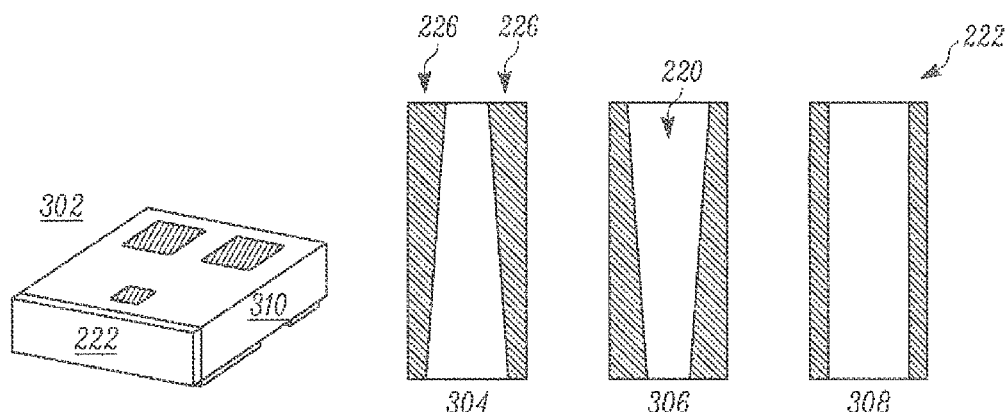

Referring to FIG. 3, the slider 200 in accordance with the present embodiment is depicted, wherein FIG. 3 includes FIGS. 3A to 3D. FIG. 3A illustrates a rear, bottom, right perspective 302 of the slider 200. FIGS. 3B to 3D planar cross-sectional side views 304, 306, 308 of various embodiments of the structures 220 forming the lubricant reservoirs 218 on the trailing edge surface 222 of the slider 200. The side views 304, 306, 308 are viewed from a side 310 of the slider 200.

The planar view 304 (FIG. 3B) depicts a structure 220 having a trapezoidal shape wherein a bottom side of the structure 220 has a longer length than a top side opposite to and parallel to the bottom side. The planar view 306 (FIG. 3C) depicts a structure 220 having a trapezoidal shape wherein a bottom side has a smaller length than a top side opposite to and parallel to the bottom side. And the planar view 308 (FIG. 3D) depicts a structure 220 having a rectangular shape.

As can be seen from the foregoing description of FIGS. 2 and 3, the channels 226 and the structures 220 may have various shapes and sizes. Regardless of the shapes of the channels 226 and the structures 220, the lubricant reservoirs 218 will function properly if the following requirements are met: (1) The contact angle of the lubricant on a wall of the channel 226 must be smaller than ninety degrees, and (2) the channels 226 should have enough volume for the expected amount of transferred lubricant.

Figure 4:
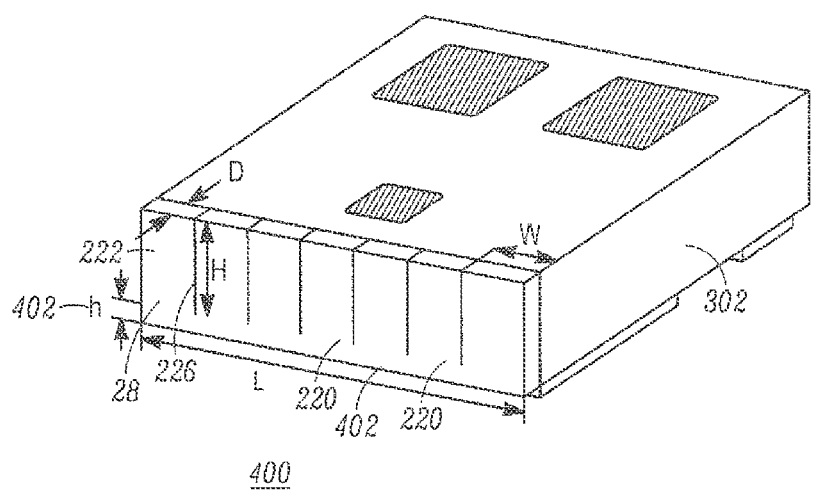
FIG. 4 illustrates a bottom, rear, left perspective view of an exemplary embodiment of the slider of FIGS. 2 and 3 in accordance with the present embodiment.

FIG. 4 shows an exemplary design of the slider 200 including lubricant reservoirs 218 to explain how the channels 226 work to guide the lubricant to the lubricant reservoirs 218 and retain the lubricant therein. The lubricant reservoirs 218 include one or more individual channels 226, each of the individual channels having a thickness D, a height H, and a width W. The individual channels 226 are preferably orthogonally disposed relative to the air bearing surface 224 of the slider 200, although other angles may be used. The lubricant reservoirs 218 preferably also include a connecting or through channel 402 of height h above the individual channels 226. The through channel 402 is preferably fluidically coupled to each of the individual channels 226. The width of the slider 200 is L.

Figure 5:
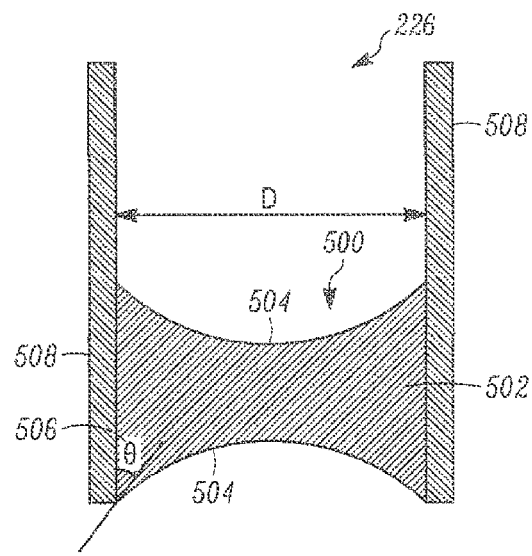
FIG. 5 is a planar cross-sectional side view of lubricant menisci in a channel of a lubricant reservoir in accordance with the present embodiment.

In an operating hard disk drive system, any transferred lubricant that flows to the trailing edge surface 222 of the slider 200 will flow into the individual channels 226 due to capillary pressure. Referring to FIG. 5, a planar cross-sectional side view of lubricant menisci 500 in a channel 226 of a lubricant reservoir 218 in accordance with the present embodiment is depicted. The lubricant 502 in the channels 226 will form the lubricant menisci 500 due to capillary action. The pressure jump across the curved surface 504 is shown in Equation (1):

$$\Delta p = \frac{\gamma \cos \theta}{R} \tag{1}$$

where $\gamma$ is surface tension of the lubricant 502, $\theta$ is a contact angle 506 of the lubricant 30 with the channel wall 508, and R is an effective radius of the channels 226, which can be expressed as shown in Equation (2):

$$\frac{1}{R} = \frac{2}{W} + \frac{2}{D} \tag{2}$$

If one of the individual channels 226 becomes full, the lubricant 502 will flow to other channels 226 via the through channel 402 until all the channels 226, including the through channel 402, are full. The channels 226, 402 should thus be designed to have a sufficient volume for the expected amount of transferred lubricant 502. For example, the total lubricant volume of a standard 2.5" disk with a one nanometer thick lubricant film is about $3 \times 10^6$ μm$^3$ on one disk surface. Assuming that twenty per cent of the lubricant 502 accumulates at the trailing edge surface 222 of the slider 200 and that the slider height is 0.3 mm and width 0.6 mm, the channels 226, 402 need to be about 3 μm thick (D) to store the transferred lubricant 502.

Figure 6:
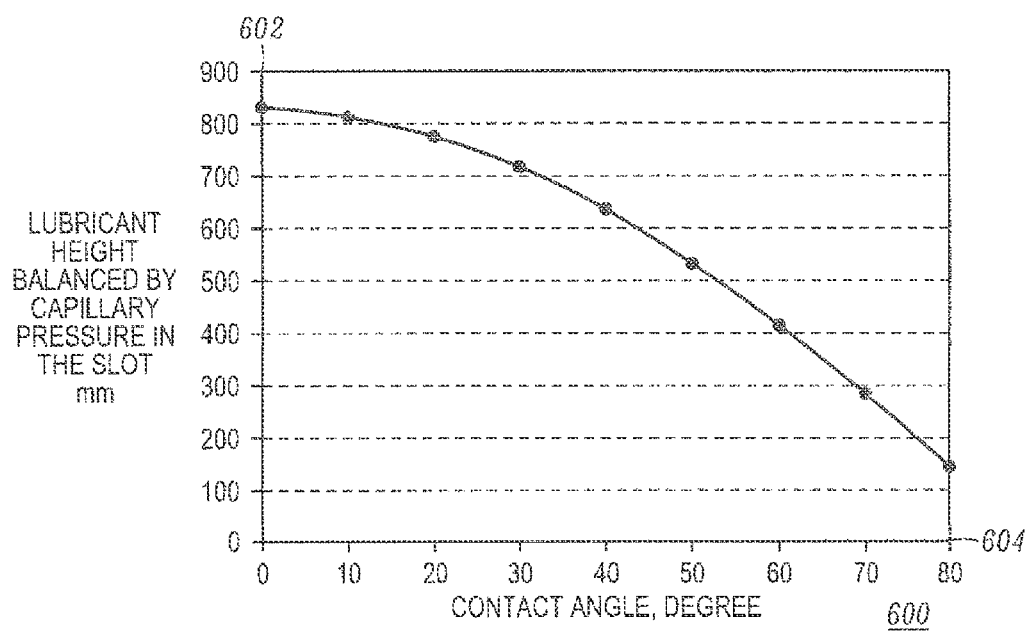
FIG. 6 is a graph of lubricant height in a channel of a lubricant reservoir as a function of contact angle with a wall of a channel in accordance with the present embodiment.

The surface tension of an exemplary hard disk drive lubricant, Zdol-2500, at 20° C. is 22 mN/m. Its specific gravity at 20° C. is 1.8 g/ml. If a 3 μm thick channel 226 is put vertically in lubricant Zdol-2500, FIG. 6 depicts a graph 600 showing the height of the lubricant pulled up by its capillary pressure on axis 602 as a function of its contact angle on the channel wall 508 charted on axis 604.

It is assumed that channel width W of each channel 226 is much larger than its thickness D and is neglected in the calculations. Even at a contact angle of 80°, it can be seen from graph 600 that the lubricant height as balanced by its capillary pressure still reaches about 145 mm. This means that if the channel 226 is placed vertically, it can retain lubricant up to a height of 145 mm therein without lubricant leaking from a bottom opening of the channel 226. Therefore, once lubricant flows into the channels 226, 402, it will not flow back to the air bearing surface 224 and the disk to cause read/write problems.

Figure 7:
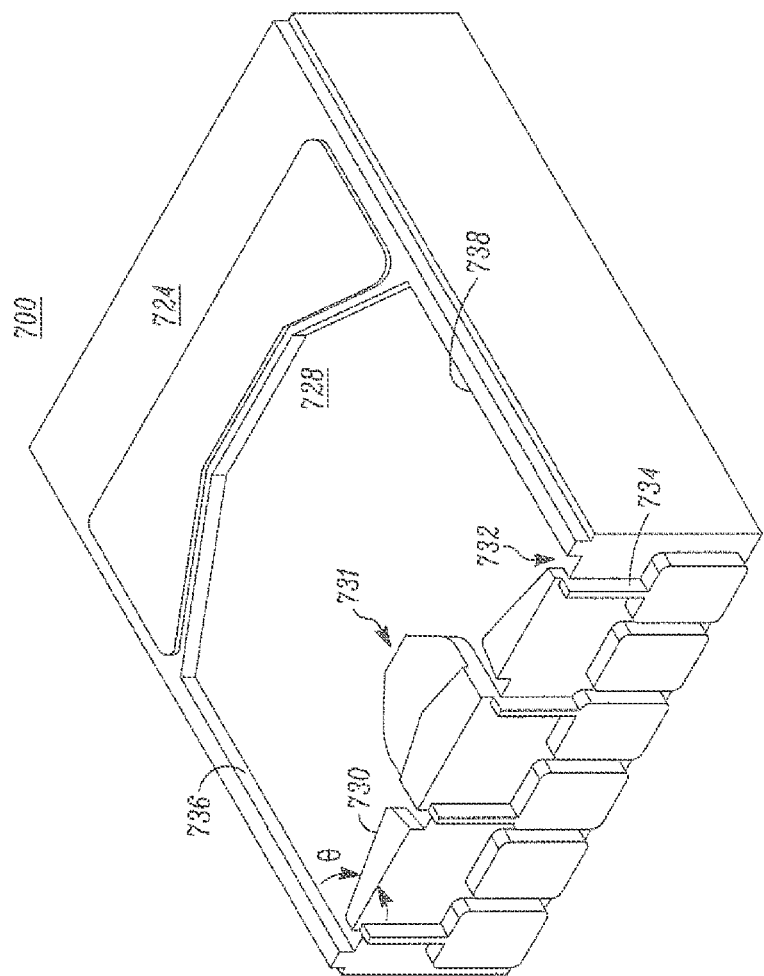
FIG. 7 illustrates a bottom, rear, left perspective view of a slider depicting an air bearing surface of the slider with the deflector pads having four channels and a high surface energy metallic rail structure located at each channel in accordance with a further embodiment.

FIG. 7 illustrates a bottom, rear, left perspective view of a slider 700 in accordance with a further embodiment. The slider 700 includes an air bearing surface 724 having a depression 728 formed therein and including deflector pads 730 for conducting the lubricant away from a read/write sensor 727. The deflector pads have ABS channels 732 formed therein and a high surface energy metallic rail structure 734 formed on a trailing edge surface 722 of the slider 700, the rail structures 734 located at each ABS channel 732. The depression 728 is formed in the air bearing surface 724 by a plurality of surfaces, these surfaces including the deflecting pads 730. The deflecting pads 730 are adjacent the ABS or lubricant channels 732 and form a portion of the depression 730 along an edge shared by the air bearing surface 724 and the trailing edge surface 722 having structures 720 formed thereon.

Each deflector pad 730 forms two lubricant channels 732 with adjacent deflector pads 730. In accordance with this further embodiment, one lubricant channel 732 is formed between a center deflection pad 731 and each adjacent deflector pad 730 and another channel is formed between the deflector pads 730 and a side surface 736, 738 of the depression 728. The deflector pads 730, 731 have a tapered leading surface to bias the lubricant flow towards a channel 732 located away from the critical center of the air bearing surface 724 where the read/write element 727 is usually located.

Adjacent exits from the lubricant channels 732, the high surface energy rail structures 734 are employed to prevent the lubricant from flowing towards the center deflection pad 731 and also to help "wick" the lubricant away from the channel 732 exit and towards lubricant reservoirs 718 formed by structures 720. In this further embodiment, the structures 720 are the contact pads or the slider electrical connections. The contact pads (or bond pads) are formed of high surface energy material such as gold. Thus the rail structures 734 can be formed of the same high surface energy material and during the patterning of the gold contact pads (i.e., the structures 720) of the slider 700. This patterning, is therefore, performed during the head wafer fabrication and not during the slider processing. Thus the rail structure 734 location and size must be predetermined according to an intended air bearing surface 724 design.

Figure 8:
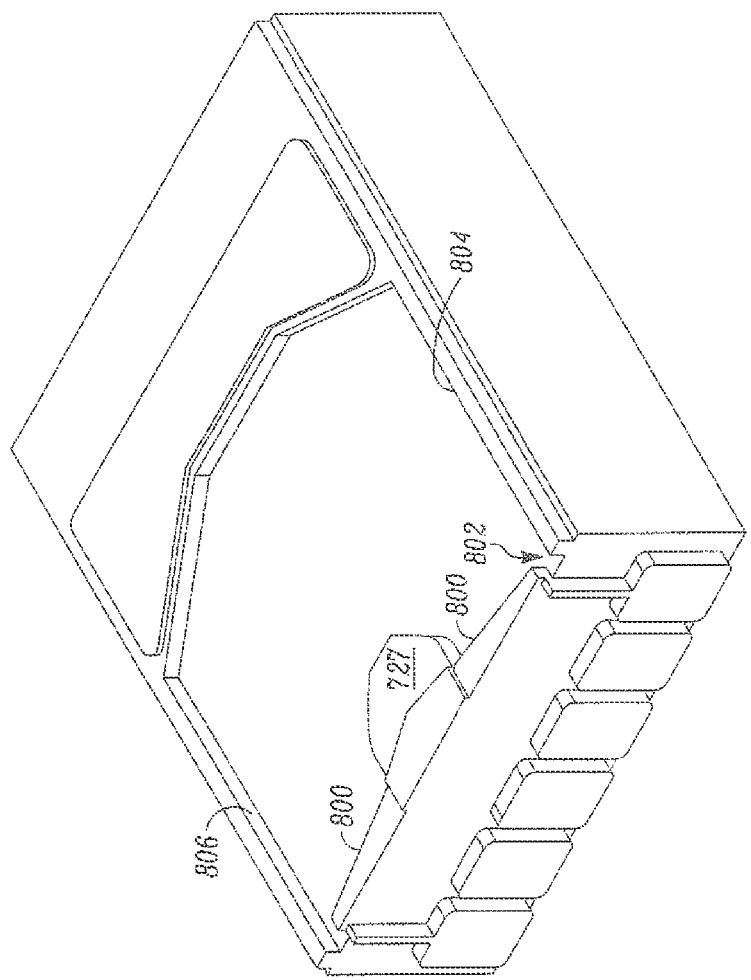
FIG. 8 illustrates a bottom, rear, left perspective view of a slider depicting an air bearing surface of the slider with the deflector pads having two channels and a high surface energy metallic rail structure located at each channel in accordance with an alternate embodiment of the slider of FIG. 7.

FIG. 8 depicts an alternate embodiment of the slider 700 where deflector pads 800 are shaped to only form one channel 802 each together with the side surfaces 804, 806. As in the earlier embodiment, leading edges of the deflector pads 800 are tapered to bias the lubricant flow to the side and away from the read/write sensor 727. In a similar manner, high surface energy structure forms a rail 808 which is employed at the channel 802 exits to serve the same function as discussed hereinabove in connection with FIG. 7.

Figure 9:
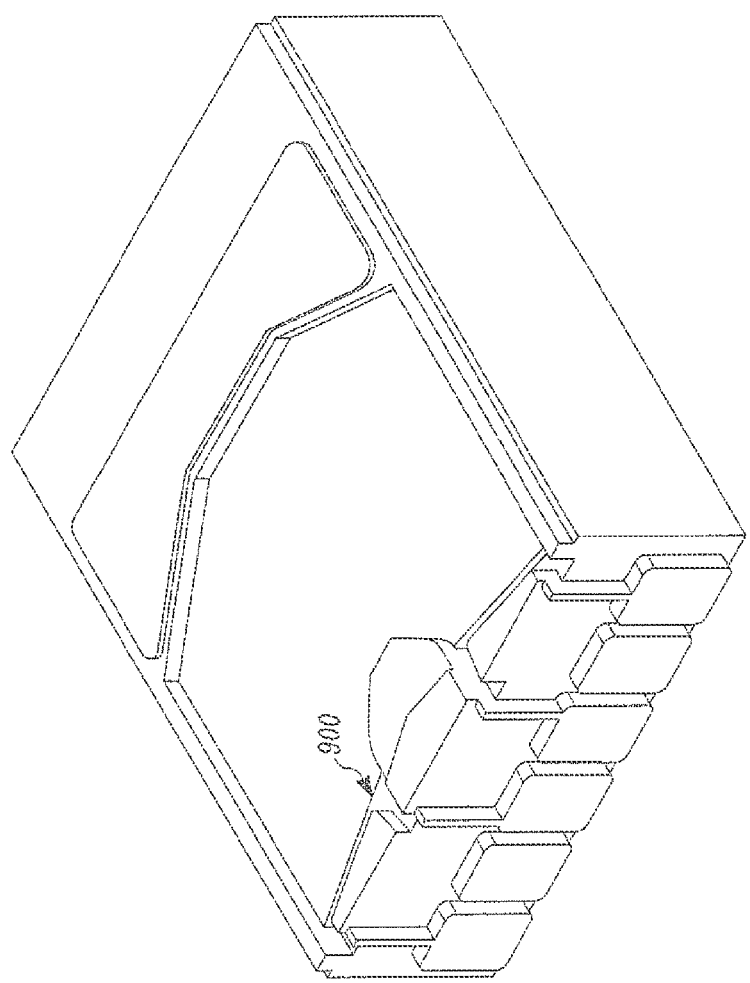
FIG. 9 illustrates a bottom, rear, left perspective view of a slider depicting an air bearing surface of the slider with an additional deep trench adjacent the leading edge of the deflector pads in accordance with a second alternate embodiment of the slider of FIG. 7.

FIG. 9 illustrates a second alternate embodiment of the slider 700 wherein the depression 728 includes trenches 900 adjacent to the leading edge of the deflector pads 730. The trenches 900 have a depth greater than the depth of a remainder of the depression 728 and are formed in the air bearing surface 724 to direct the lubricant towards the lubricant channels 732. The trenches 800 provide increased channel floor area (i.e., the area of the floor of the channels 732 and the floor of the trenches 800) relative to the ABS surface. Therefore, more high surface energy pattern can be provided to the channel floor area making it more difficult for the lubricant to flow towards the center deflection pad 731.

Figure 10:
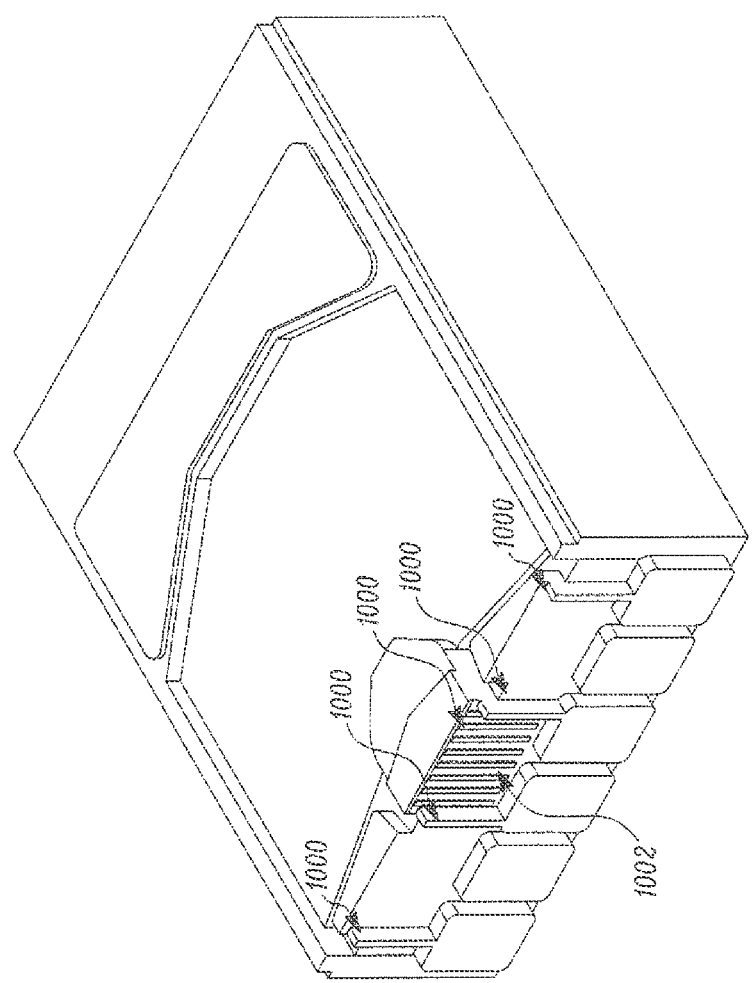
FIG. 10 illustrates a bottom, rear, left perspective view of a slider depicting an air bearing surface of the slider having additional high surface energy films patterned near the channel exits and the area near the deflector pads in accordance with a third alternate embodiment of the slider of FIG. 7.

FIG. 10 illustrates a third embodiment of the slider 700 where high surface energy film 1000 is patterned on the trailing edge surface 722 adjacent exits from the lubricant channels 732 and adjacent the center deflection pad 731. High surface energy films 1000 (such as films made from gold) have a low contact angle and thus allow the lubricant to spread thinly on the trailing edge surface 722. The low contact angle coupled with the other forces acting on the lubricant at the channel 732 exits (e.g. forces such as disjoint pressure and air shear force) allows the lubricant to be "wicked" away from the floor of the depression 728. Also, a thinly spread lubricant makes it more difficult for gravity to reflow the lubricant towards the air bearing surface 724. Any lubricant that is transferred to an area 1002 adjacent the center deflection pad 731 is also held in place by the patterned high surface energy film deployed adjacent thereto. Film material, thickness, pattern shape and sizes are parameters that can be tuned to suit the kind of lubricant that needs to be managed.

Figure 11:
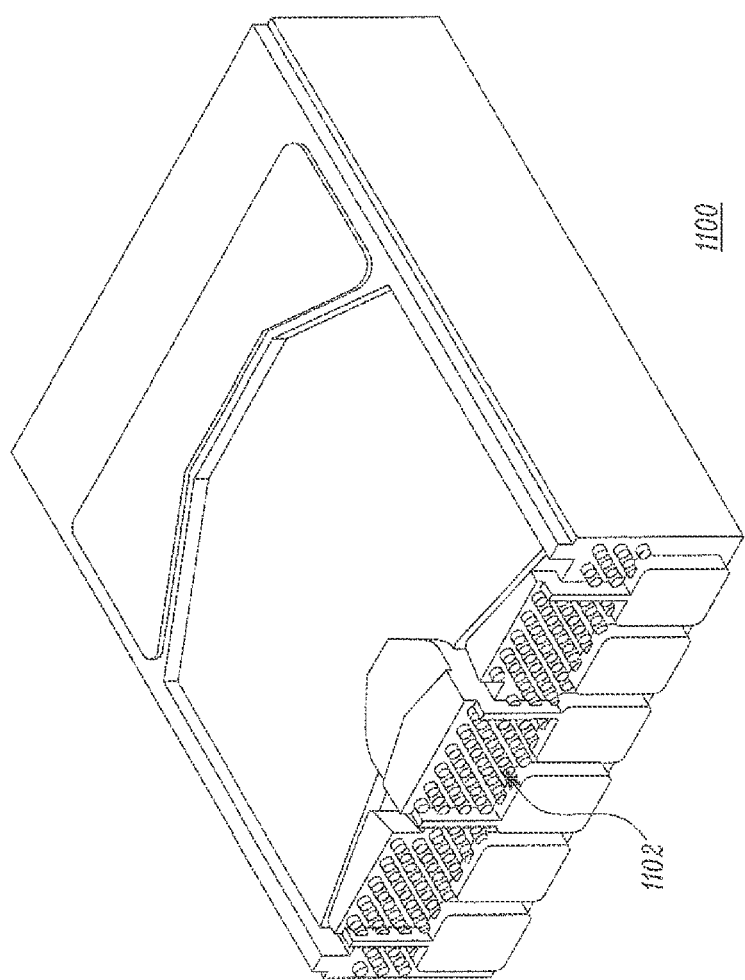
FIG. 11 illustrates a bottom, rear, left perspective view of a slider depicting an air bearing surface of the slider and a trailing edge surface with a patterned high surface energy structure thereon in accordance with a fourth alternate embodiment of the slider of FIG. 7.

FIG. 11 illustrates a bottom, rear, left perspective view 1100 in accordance with a fourth alternate embodiment of the slider 700 depicting an air bearing surface 724 and a trailing edge surface 722. The trailing edge surface includes a patterned high surface energy structure 1102 including patterned high surface energy materials strategically located on the trailing edge surface 722. In this embodiment, the patterned high surface energy structure 1102 includes round pillars that are arrayed on the trailing edge surface 722. While round pillars are depicted, the patterns could take any shape and size and still achieve the same purpose. The meniscus force between the pillars and the lubricant will act like an anchor to prevent the lubricant from cascading back to the air bearing surface 724. The material, thickness, pattern shape and sizes are parameters that can all be tuned to suit the kind of lubricant that needs to be managed.

Figure 12:
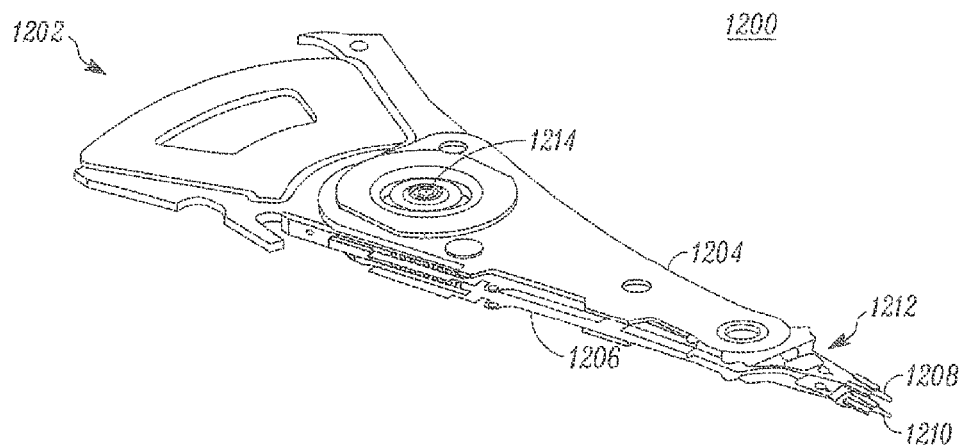
FIG. 12 illustrates a top, front, left perspective view of a head-stack assembly incorporating a slider in accordance with the present embodiment.

Referring to FIG. 12, a top, front, left perspective view 1200 of a head-stack assembly 1202 in accordance with the present embodiment is depicted. The head stack assembly 1202 includes an upper actuator arm 1204 and a lower actuator arm 1206. This configuration allows reading from and writing to a two-sided disk rotating between the upper actuator arm 1204 and the lower actuator arm 1206.

An upper slider 1208 and a lower slider 1210 are constructed with lubricant containment structures such as lubricant reservoirs in accordance with any of the embodiments discussed hereinabove. The upper slider 1208 has the air bearing surface 224, 724 on the bottom side and the lower slider 1210 has the air bearing surface 224, 724 on the top side so that the air bearing surface is facing the disk rotating between the upper slider 1208 and the lower slider 1210.

The upper slider 1208 and the lower slider 1210 are each bonded to a suspension which is a small arm for holding the slider 1208, 1210 in position above or beneath a disk. Each suspension and slider 1208. 1210 combination are called a head-gimbal assembly 1212 and the head-gimbal assemblies 1212 are attached to respective actuator arms 1204, 1206 which are stacked together to form the head-stack assembly 1202. The head-stack assembly 1202 is propelled above and below a disk surface by an actuator (not shown) which pivots the head-stack assembly around a point 1214.

Figure 13:
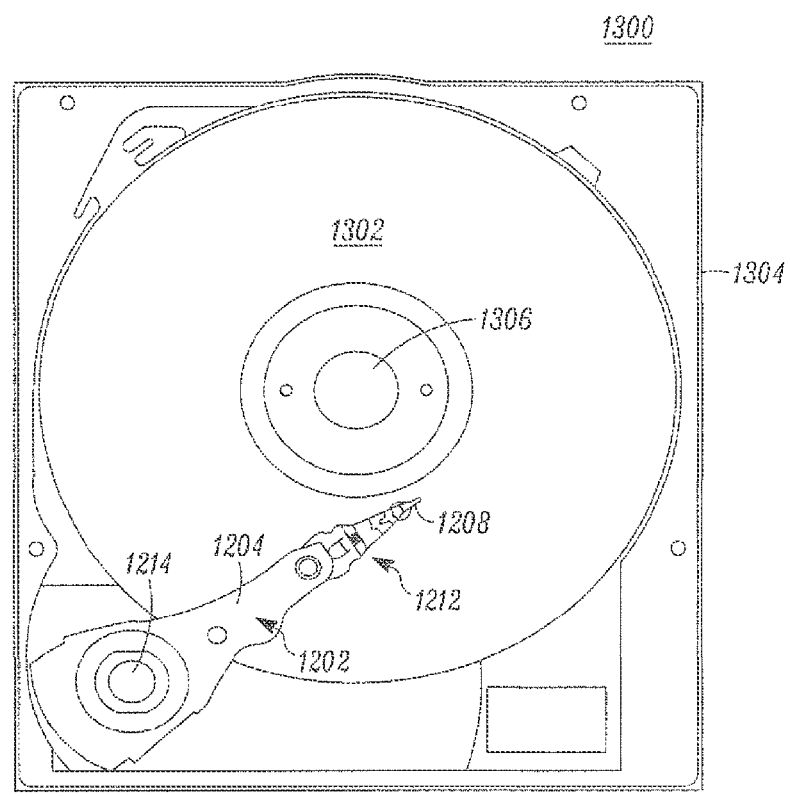
FIG. 13 illustrates a top planar view of a hard disk drive system including the head stack assembly in accordance with FIG. 12.

A top, planar view 1300 of a hard disk drive system in accordance with the present embodiment is depicted in FIG. 13. A disk 1302 is located in a hard disk drive enclosure or housing 1304 and rotates around a center 1306 coupled to a motor (not shown). The head-stack assembly 1202 is pivoted around the point 1214 by the actuator so that the slider 1208 can read or write at any point on the disk 1302 by the combination of the disk 1302 rotation and the actuator arm 1204 pivoting.

As the air bearing surface 224, 724 flies across the rotating disk 1302 at mere nanometers away from the top lubricant layer of the disk 1302, lubricant from the top lubricant layer of the disk 1302 migrates to the slider 1208. The features of the present invention as described in more detail in accordance with FIGS. 2 to 11, contain the lubricant which flows towards and onto a trailing edge of the slider 1208 due to the air shear force imparted by the air flow from the rotating disk 1302 so that the lubricant accumulated on the trailing edge of the slider 1208 cannot migrate back to the air bearing surface 224, 724 in response to gravitational or other attractive forces. The features of the present embodiments thereby lessen loss of magnetic sensitivity of the read/write head 227, 727 and, consequently, diminish degradation of recording performance of the hard disk drive system 1300. The containment of the transferred lubricant on the trailing edge of the slider 1208 minimize disk drive performance degradation caused by lubricant pick-up.

Thus it can be seen that a slider 200, 700 for a hard disk drive system has been provided which eliminates the problems associated with transferred lubricants. Such slider 200, 700 in accordance with the various embodiments disclosed can provide features such as channels 226, 732, trenches 900 and structures 220, 734, 1000, 1102 which guide the transferred lubricant away from the air bearing surface 224, 724 and retains it within the lubricant reservoirs 218. While several exemplary embodiments have been presented in the foregoing detailed description of the invention, it should be appreciated that a vast number of variations exist, including variations as to the materials and shapes used to form the various structures 220, 734, 1000, 1102.

It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing an exemplary embodiment of the invention, it being understood that various changes may be made in the function and arrangement of elements and method of fabrication described in an exemplary embodiment without departing from the scope of the invention as set forth in the appended claims.

What is claimed is:

1. A slider for reading data from and writing data onto a hard disk, the slider comprising:
    an air bearing surface for providing a read/write sensor above the surface of the hard disk;
    at least one surface orthogonal to and having a shared edge with the air bearing surface; and
    one or more structures for forming lubricant reservoirs fluidically coupled to the air bearing surface to prevent lubricant buildup thereon, wherein at least one of the one or more structures are formed on the at least one surface orthogonal to the air bearing surface.

2. The slider in accordance with claim 1 wherein the at least one surface comprises a trailing edge surface.

3. The slider in accordance with claim 1 wherein each of the one or more structures has a predetermined outline to form the lubricant reservoirs of one or more geometric shapes for the lubricant to enter the lubricant reservoirs by capillary action and the lubricant reservoirs to maintain the lubricant therein by surface tension.

4. The slider in accordance with claim 3 wherein the one or more geometric shapes include a trapezoidal shape having a lubricant entry side with a smaller length than a side opposite to and parallel to the lubricant entry side.

5. The slider in accordance with claim 4 wherein the one or more geometric shapes include an entry portion having the trapezoidal shape and a remaining portion having a rectangular shape.

6. The slider in accordance with claim 3 wherein the one or more geometric shapes include a trapezoidal shape having a lubricant entry side with a longer length than a side opposite to and parallel to the lubricant entry side.

7. The slider in accordance with claim 6 wherein the one or more geometric shapes include an entry portion having a rectangular shape and a remaining portion having the trapezoidal shape.

8. The slider in accordance with claim 3 wherein the one or more geometric shapes include a rectangular shape having a lubricant entry side with a substantially equal length to a side opposite to and parallel to the lubricant entry side.

9. The slider in accordance with claim 1 wherein the air bearing surface has a depression formed therein by a plurality of surfaces, wherein the plurality of surfaces include deflecting surfaces adjacent one or more lubricant channels and forming a portion of the depression along the shared edge of the air bearing surface and the at least one surface having the structures formed thereon, and wherein the deflecting surfaces conduct the lubricant away from the read/write sensor.

10. The slider in accordance with claim 9 wherein some of the one or more structures has one of one or more rails connected thereto and leading to the shared edge, wherein the one or more structures and the one or more rails are formed of a high surface energy material for wicking the lubricant from the lubricant channels on the air bearing surface to the lubricant reservoirs.

11. The slider in accordance with claim 10 wherein the high surface energy material is gold.

12. The slider in accordance with claim 9 wherein the lubricant channels comprise two lubricant channels.

13. The slider in accordance with claim 9 wherein the lubricant channels comprise four lubricant channels.

14. The slider in accordance with claim 9 wherein the depression formed in the air bearing surface includes one or more trenches, the one or more trenches having a depth greater than a remainder of the depression and formed in the air bearing surface to direct the lubricant towards the lubricant channels.

15. The slider in accordance with claim 9 wherein a film comprising high surface energy material is patterned onto the at least one surface at one or more locations adjacent exits from the lubricant channels onto the at least one surface.

16. The slider in accordance with claim 9 wherein pillars comprising high surface energy material and having a predetermined shape and size are formed on the at least one surface.

17. The slider in accordance with claim 1 wherein the one or more structures are bonding pads formed on the at least one surface.

18. The slider in accordance with claim 17 wherein the bonding pads are formed of a high surface energy metal.

19. A hard disk drive system comprising:
    a hard disk comprising a plurality of layers, wherein at least a topmost one of the plurality of layers comprises a lubricant layer; and
    at least one slider structure for reading data from and writing data onto the hard disk, the at least one slider structure comprising:
        an air bearing surface including a read/write sensor for reading and writing the data from/onto the hard disk;
        at least one surface orthogonal to and having a shared edge with the air bearing surface; and
        one or more structures for forming lubricant reservoirs fluidically coupled to the air bearing surface to prevent lubricant buildup thereon, wherein at least one of the one or more structures are formed on the at least one surface orthogonal to the air bearing surface.

20. The hard disk drive system in accordance with claim 19 wherein each of the one or more structures has a predetermined outline to form the lubricant reservoirs of one or more geometric shapes for the lubricant to enter the lubricant reservoirs by capillary action and the lubricant reservoirs to maintain the lubricant therein by surface tension.

21. The hard disk drive system in accordance with claim 19 wherein the one or more structures for guiding movement of the lubricant from the air bearing surface to the lubricant reservoirs are selected from the group of structures comprising a depression formed in the air bearing surface, one or more deflecting surfaces forming one side of the depression, channels formed alongside the one or more deflecting surfaces, deep trenches formed in the depression and connected to the channels, rails from the channels to some of the one or more structures formed on the at least one surface, high surface energy metal used to form the rails and/or the one or more structures, and high surface energy metallic materials patterned onto the at least one surface either as films adjacent exits from the channels or as pillars of a predetermined shape and size arrayed on the at least one surface.

22. A head-stack assembly for a hard disk drive system comprising:
one or more actuator arms; and
one or more slider structures for reading data from and writing data onto a hard disk, each of the one or more slider structures coupled to a distal end of one of the actuator arms and comprising:
an air bearing surface for providing a read/write sensor above the surface of the hard disk;
at least one surface orthogonal to and having a shared edge with the air bearing surface; and
one or more structures for forming lubricant reservoirs fluidically coupled to the air bearing surface to prevent lubricant buildup thereon, wherein at least one of the one or more structures are formed on the at least one surface orthogonal to the air bearing surface.

23. The head-stack assembly in accordance with claim 22 wherein the one or more structures for guiding movement of the lubricant from the air bearing surface to the lubricant reservoirs are selected from the group of structures comprising a depression formed in the air bearing surface, one or more deflecting surfaces forming one side of the depression, channels formed alongside the one or more deflecting surfaces, deep trenches formed in the depression and connected to the channels, rails from the channels to some of the one or more structures formed on the at least one surface, high surface energy metal used to form the rails and/or the one or more structures, and high surface energy metallic materials patterned onto the at least one surface either as films adjacent exits from the channels or as pillars of a predetermined shape and size arrayed on the at least one surface.

24. A head-gimbal assembly for a hard disk drive system comprising:
one or more arms; and
one or more slider structures for reading data from and writing data onto a hard disk, each of the one or more slider structures coupled to a distal end of one of the arms and comprising:
an air bearing surface for providing a read/write sensor above the surface of the hard disk;
at least one surface orthogonal to and having a shared edge with the air bearing surface; and
one or more structures for forming lubricant reservoirs fluidically coupled to the air bearing surface to prevent lubricant buildup thereon, wherein at least one of the one or more structures are formed on the at least one surface orthogonal to the air bearing surface.

* * * * *

UNITED STATES PATENT AND TRADEMARK OFFICE
CERTIFICATE OF CORRECTION

PATENT NO.         : 8,514,521 B2  
APPLICATION NO.    : 13/415300  
DATED              : August 20, 2013  
INVENTOR(S)        : Yansheng Ma et al.

Page 1 of 1

It is certified that error appears in the above-identified patent and that said Letters Patent is hereby corrected as shown below:

On the Title page item (30), please add the foreign priority.

Foreign Priority

SINGAPORE
201101763-9; 03-09-2011

SINGAPORE
201106758-4; 09-19-2011

Signed and Sealed this
Twenty-second Day of July, 2014

Michelle K. Lee
*Deputy Director of the United States Patent and Trademark Office*